US011599583B2

(12) United States Patent
George et al.

(10) Patent No.: US 11,599,583 B2
(45) Date of Patent: Mar. 7, 2023

(54) DEEP PAGINATION SYSTEM

(71) Applicant: PayPal, Inc., San Jose, CA (US)

(72) Inventors: Abil Naithelloor George, Bangalore (IN); Sharath Raghu, Bangalore (IN)

(73) Assignee: PAYPAL, INC., San Jose, CA (US)

( * ) Notice: Subject to any disclaimer, the term of this patent is extended or adjusted under 35 U.S.C. 154(b) by 259 days.

(21) Appl. No.: 16/856,426

(22) Filed: Apr. 23, 2020

(65) Prior Publication Data

US 2021/0334316 A1    Oct. 28, 2021

(51) Int. Cl.
*G06F 16/951* (2019.01)
*G06F 16/2455* (2019.01)
*G06F 16/953* (2019.01)

(52) U.S. Cl.
CPC ...... *G06F 16/951* (2019.01); *G06F 16/24568* (2019.01); *G06F 16/953* (2019.01)

(58) Field of Classification Search
CPC ... G06F 16/951; G06F 16/953; G06F 16/2456
USPC ........................................................ 707/706
See application file for complete search history.

(56) References Cited

U.S. PATENT DOCUMENTS

| 10,476,662 | B2* | 11/2019 | Yuan ................... H04L 9/0894 |
| 10,541,983 | B1* | 1/2020 | Khashei Varnamkhasti ................ H04L 9/085 |
| 10,795,884 | B2* | 10/2020 | Bhattacharjee ..... G06F 16/2465 |
| 2008/0301256 | A1* | 12/2008 | McWilliams ....... G06F 12/0806 714/E11.178 |
| 2014/0359029 | A1* | 12/2014 | Jagadish ................. H04L 51/42 709/206 |
| 2014/0379631 | A1* | 12/2014 | Sebastian ............. G06F 16/245 707/607 |
| 2015/0363481 | A1* | 12/2015 | Haynes .................. G06Q 10/10 707/748 |
| 2017/0139991 | A1* | 5/2017 | Teletia ................ G06F 16/9024 |
| 2017/0193040 | A1* | 7/2017 | Agrawal ................. G06F 16/22 |
| 2018/0032528 | A1* | 2/2018 | Turner ............. G06F 16/24578 |
| 2019/0065545 | A1* | 2/2019 | Hazel ................... G06F 16/2282 |
| 2020/0372004 | A1* | 11/2020 | Barber ................. G06F 16/213 |
| 2021/0097082 | A1* | 4/2021 | Billa ................... G06F 16/9024 |
| 2021/0157504 | A1* | 5/2021 | Hinman .................. G06F 3/067 |
| 2021/0248151 | A1* | 8/2021 | Kadel .................... G06Q 10/08 |

OTHER PUBLICATIONS

"The Definitive Guide [2) Elasticsearch: The Definitive Guide [2.x] » Getting Started » Searching—The Basic Tools » Pagination", © 2020. Elasticsearch B.V., https://www.elastic.co/guide/en/elasticsearch/guide/current/pagination.html.

(Continued)

*Primary Examiner* — Mark E Hershley
(74) *Attorney, Agent, or Firm* — Haynes and Boone, LLP

(57) ABSTRACT

A server computing device receives, from a client device, a request for data objects. The server computing device calculates a number of data objects to be returned to the client device based on the request for data and performs a first query with a distributed search engine to search a distributed index for the data objects in the request based on at least a first portion of the number of data objects. The server computing device then write each data object from a first data object set returned by the distributed search engine from the distributed index to an output stream buffer and sends the data objects stored in the output buffer when a first condition is satisfied.

20 Claims, 8 Drawing Sheets

(56) References Cited

OTHER PUBLICATIONS

Khalid Abuhakmeh, "Be Careful of Sinking in Elasticsearch Deep Paging Quicksand", Published Dec. 2, 2017, https://rimdev.io/elasticsearch-sinking-in-deep-paging-quicksand/.

* cited by examiner

DEEP PAGINATION SYSTEM

FIELD OF INVENTION

The present specification generally relates to deep pagination in distributed databases according to various embodiments of the disclosure.

BACKGROUND

A distributed database is a database in which storage devices are not all attached to a common processor. The distributed database may be stored in multiple computers, located in the same physical location, or may be dispersed over a network of interconnected computers. The multiple computers may be referred to as a cluster of nodes that may store a distributed index that is a collection of "documents" or other data objects distributed across the nodes. The distributed index may include a plurality of subsets called shards that are distributed over the various nodes and that store the various data objects. The distributed database may use a distributed search engine such as, for example, Elasticsearch™ to store, retrieve, and manage the various data objects stored in the distributed database. Distributed search engines often use pagination to retrieve the data objects when a search of the distributed database is performed.

Figure 1:
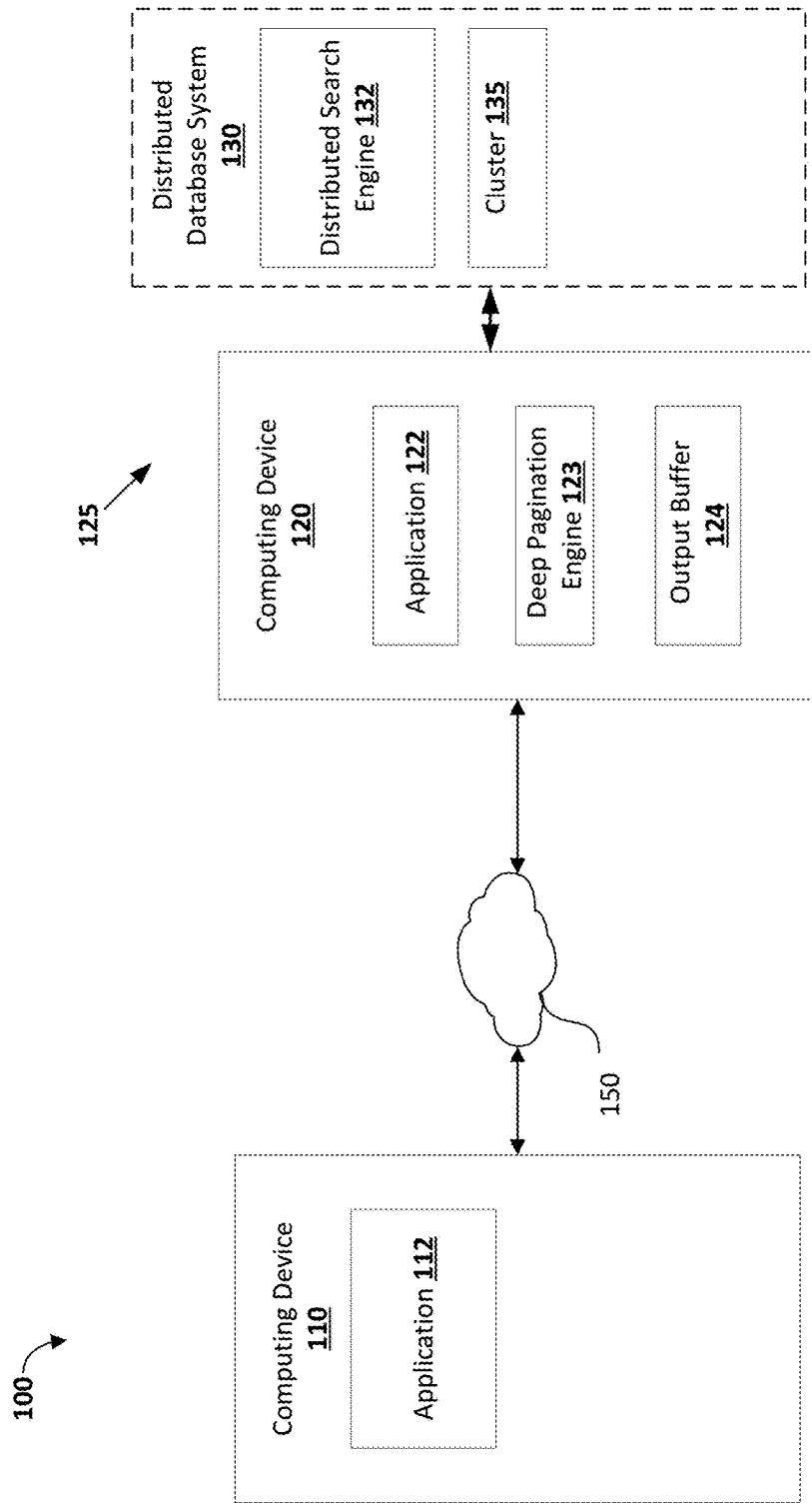
FIG. 1 is a block diagram illustrating a networked system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for using distributed databases that require deep pagination to return requested data objects to a client system. As discussed above, distributed search engines may use pagination to provide a response to a request for data stored in a distributed database. Pagination provides many benefits when responding to the request for data. For example, pagination is used for easier handling of a response when there are many results. Pagination may make use of caching in the distributed database as the request to retrieve the next page will be served out of cache. With pagination, the amount of memory required on the server per request is lower as the server processes a portion of results instead of the whole result set and recovering from a failure during transmission is much easier if pagination is used as the server can resend only the last failed page.

However, there are issues with pagination when the number of data objects that are to be returned for a request is relatively high. Distributed databases typically have a limit on the number of results returned per request. For example, the maximum number of data objects returned for a request may be 10,000 and these data objects may be paginated with a maximum of 500 results per page. However, this limit is not sufficient for various scenarios such as, for example, a merchant that wants to retrieve all of their transactions for a single day where that merchant may have over a million transactions. This maximum on the number of results is in place to prevent diminished performance on the distributed database system. If the number of results exceeds the limit, then deep pagination occurs, which is problematic. Deep pagination occurs when a request for data requires a number of pages into a dataset that begins to diminish the performance of a coordinating node that is coordinating the data results.

For example, where a distributed search engine is searching a distributed index that includes five shards, when a first page of results (e.g., results 1-500) is requested, each shard produces its own top 500 results and returns those 500 results to a coordinating node, which then sorts all 2500 results (500 results for each of the five shards) in order to select the overall top 500 results and the other 2000 results are discarded. If the request is for 1,000 results, then the first page is requested and returned as described above, and a second page of results (e.g., results 501-1,000) is requested. For the second page of results, each shard produces its own 1,000 results, and returns those 1,000 results to the coordinating node, which then sorts all 5,000 results (1,000 results for each of the five shards) in order to select the overall top 500 results and the other 4,500 results are discarded. Now, if the request is for 10,000 results, which requires 20 pages of results, pages 1-19 are generated as discussed above. For the twentieth page of results, each shard produces its own 10,000 results, and returns those 10,000 results to the coordinating node, which then sorts all 50,000 results (10,000 results for each of the five shards) in order to select the overall top 500 results and the other 49,500 results are discarded. As can be seen, the cost of sorting results grows exponentially the deeper the results are paged. Performance testing of a distributed database system may be performed to determine an upper limit on the number of results that can be returned by the distributed database system without significantly affecting performances, which may be determined based on a predetermined performance condition set by an administrator. Typically, the upper limit of results is around 10,000 results before performance deteriorates to unacceptable levels. In some instances, the paging too deeply causes latency of the system or even cause the system to become unavailable.

Systems and methods of the present disclosure provide a solution to the deep paginating over a result set in conventional distributed databases. For every request for data objects from a client device, the number of data objects to be returned is calculated. If the number of data objects is above the predetermined threshold of results, the results up to the predetermined threshold of results are searched and returned using pagination, stored in an output buffer, and streamed out to the client device making the request each time the output buffer is filled, or another buffer flush condition exists. The final data object of the previous search is tracked, and another search of the distributed database is then performed for the next set of results after the final data object of the first search up to the predetermined threshold of results (e.g., results 10,001-20,000) using pagination. As such, the second set of results for page 20 in the second query returns 500 results and discards 49,500. While in a conventional distributed system, the coordinating node returns 500 results for page 40 and discards 99,500 results. This is repeated until all of the data objects in the request from the client device are returned.

FIG. 1 illustrates a networked system 100 according to one embodiment of the disclosure. The networked system 100 includes a computing device 110, a computing device 120, and a distributed database system 130, that may be communicatively coupled with each other via a network 150. The network 150, in one embodiment, may be implemented as a single network or a combination of multiple networks. For example, in various embodiments, the network 150 may include the Internet and/or one or more intranets, landline networks, wireless networks, and/or other appropriate types of communication networks. In another example, the network 150 may include a wireless telecommunications network (e.g., cellular phone network) adapted to communicate with other communication networks, such as the Internet.

The computing device 110 may include, for example, an external network resource that may be utilized by a user to interact with the computing device 120 that may include an internal network resource over the network 150. For example, the user may use the computing device 110 to request data from the computing device 120 via a website hosted by the computing device 120, a mobile application associated with the computing device 120, and/or any other client-to-server interface associated with the computing device 120. The computing device 110, in various embodiments, may be implemented using any appropriate combination of hardware and/or software configured for wired and/or wireless communication over the network 150. In various implementations, the computing device 110 may include at least one of a wireless cellular phone, wearable computing device, PC, laptop, etc.

The computing device 110, in one embodiment, includes an application 112 such as, for example, an external application (e.g., a client application such as, for example, a web browser, a mobile payment application, etc.), and/or any other application that would be apparent to one of skill in the art in possession of the present disclosure, which may be utilized by the user to request data from the computing device 120 over the network 150 or any other client/server interaction that would be apparent to one of skill in the art in possession of the present disclosure. Even though only one computing device 110 is shown in FIG. 1, it is contemplated that one or more external network resources (each similar to the computing device 110) may be communicatively coupled with the computing device 120 and/or the distributed database server 130 via the network 150 within the networked system 100.

The computing device 120, in various embodiments, may be maintained by an operating entity (or in some cases, by a partner of an operating entity that processes transactions on behalf of the operating entity and/or retrieves data from the distributed database system 130 in response to requests from the computing device 110). Examples of operating entities include but are not limited to merchant sites, resource information sites, utility sites, real estate management sites, social networking sites, payment provider sites, etc., which offer various services accessible over the network 150. Even though only one computing device 120 is shown in FIG. 1, it has been contemplated that one or more internal network resources (each similar to the computing device 120) may be accessible to one or more external network resources that are provided by the computing device 110 and/or the distributed database server 130 via the network 150 within the networked system 100.

The computing device 120, in one embodiment, may include an application 122, which may be configured to provide information over the network 150 to the application 112 of the computing device 110. For example, the user of the computing device 110 may interact with the application 122 through the application 112 over the network 150 to request data, conduct a commercial transaction, or otherwise interact with the application 122. The computing device 120 may also include a deep pagination engine 123 that is configured to perform the functionality of the deep pagination engines and/or computing devices, as well as any other functionality, discussed below. The computing device 120 may include an output buffer 124 that stores data objects retrieved from the distributed database system 130 and may include a storage device such as, for example, an in-memory network buffer or other buffer that would be apparent to one of skill in the art in possession of the present disclosure.

In various embodiments, the distributed database system 130 and, in some embodiments, the computing device 120 may be included in a deep pagination system of the present disclosure. The distributed database system 130, in one embodiment, may be maintained by a transaction processing entity, an online service provider, or another operating entity, which may provide storage and search services for interactions of the computing device 110 and the computing device 120. As such, the distributed database system 130 may include a distributed search engine 132 (e.g., Elasticsearch™ search engine), which may be adapted to interact with the computing device 110 and/or the computing device 120 over the network 150 to facilitate a result set of data objects in response to a request for data offered by the distributed database system 130. In one example, the distributed database system 130 may be provided by PayPal®, Inc., of San Jose, Calif., USA, and/or one or more service entities or a respective intermediary. The distributed search engine 132 may search documents, transactions, and/or other data objects that are stored in a cluster 135 that may include a plurality of computing devices that each store one or more subsets (e.g., shards) of one or more distributed indexes over the cluster 135. Each shard may include a plurality of data objects (e.g., a JSON object in Elasticsearch). While a specific example of a networked system 100 is illustrated, one of skill in the art in possession of the present disclosure will recognize that a variety of topologies, additional devices, and/or configurations of a distributed database system may be contemplated without departing from the scope of the present disclosure.

Figure 2:
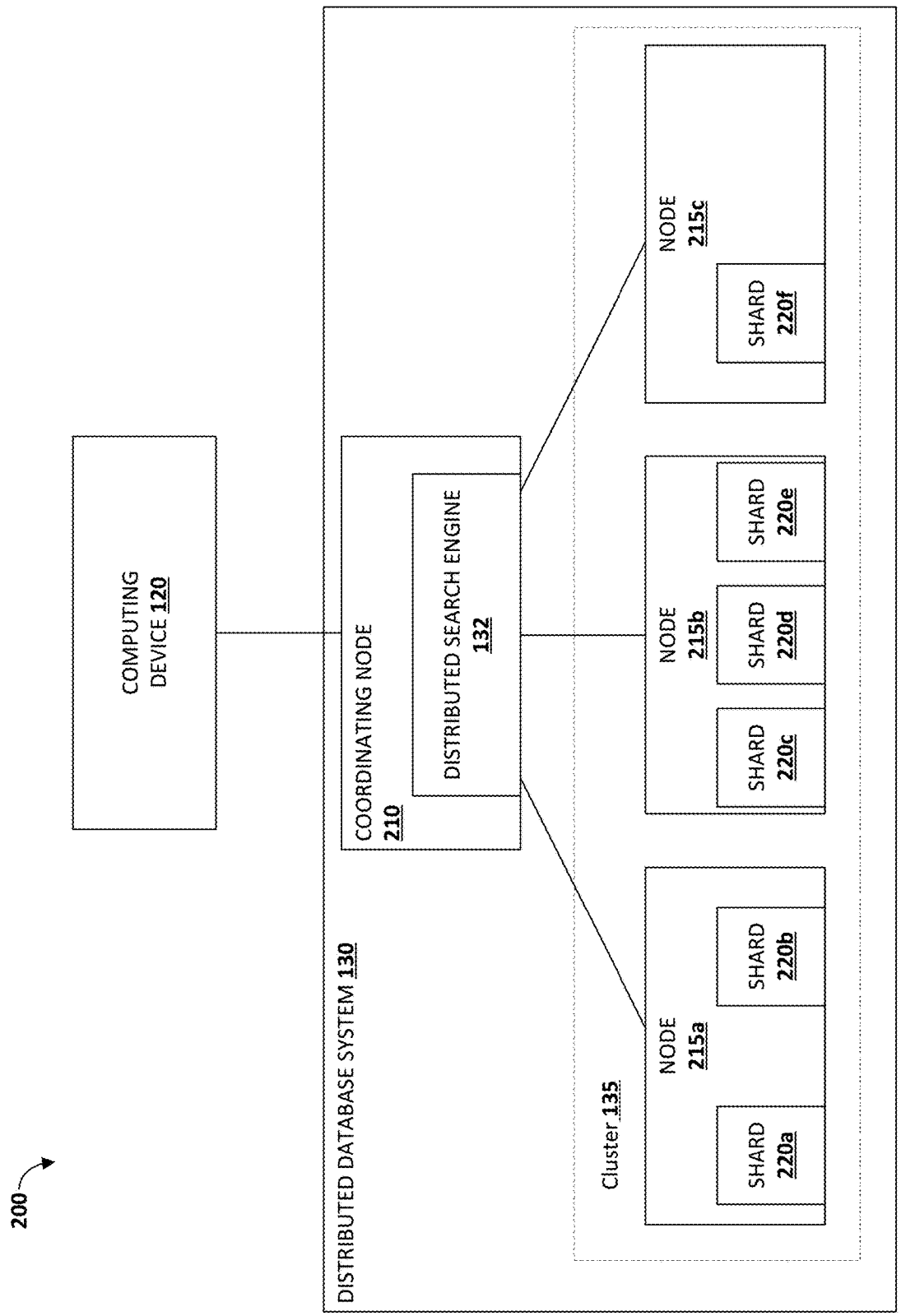
FIG. 2 is a block diagram illustrating a deep pagination system that is included in the networked system of FIG. 1 according to an embodiment of the present disclosure.

Referring now to FIG. 2, a deep pagination system 200, which may include the deep pagination system 125 of FIG. 1 is illustrated. In some embodiments, the deep pagination system 125 may include the computing device 120. However, in other embodiments the computing device 110 may directly communicate with the distributed database 130 over the network 150 without the computing device 120. In the illustrated embodiment, the computing device 120 may be coupled to a coordinating node 210 that includes that distributed search engine 132. The coordinating node 210 may be coupled to one or more computing nodes (e.g., nodes 215a, 215b, and/or up to 215c) that are included in the cluster 135. The nodes 215a-215c and coordinating node 210 may each include a server computing device that holds some data and participates on the cluster's indexing and querying. The coordinating node 210 is the node that connects to the cluster of nodes 215a-215c as a client. Each node 215a-215c may include one or more shards 220a, 220b, 220c, 220d, 220e, and/or up to 220f of a distributed index of data objects. For example, the node 215a may include the shards 220a and 220b, the node 215b may include the shard 220c, 220d, and 220e, and the node 215c may include the shard 220f. Each shard 220a-220f may include storage devices that store a plurality of data objects. In various embodiments, each shard 220a-220f may include an instance of the distributed search engine 132 that is configured to perform a search of its respective shard 220a-220f.

Figure 3A:
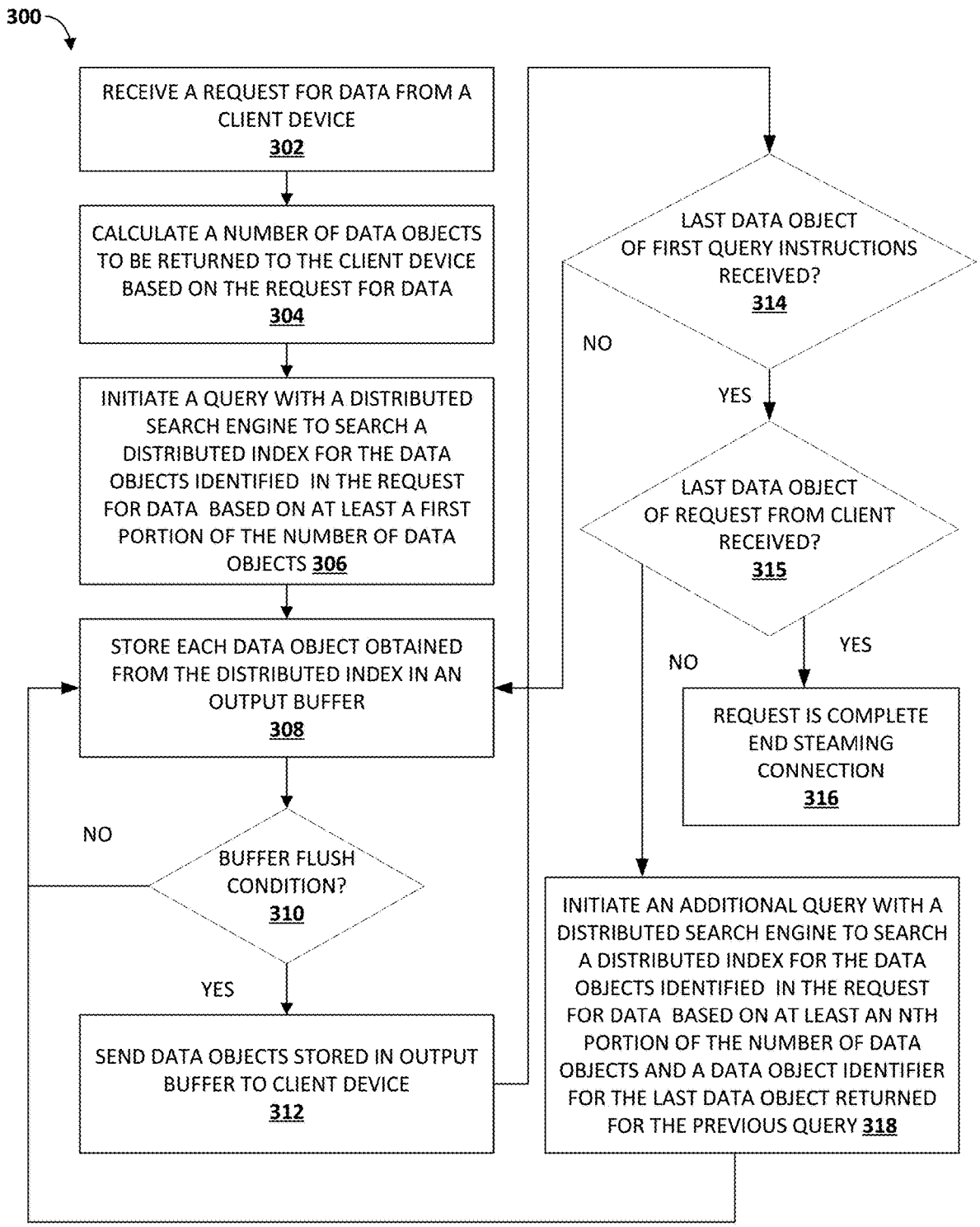
FIG. 3A is flowchart illustrating a method of deep pagination according to an embodiment of the present disclosure.
Figure 3B:
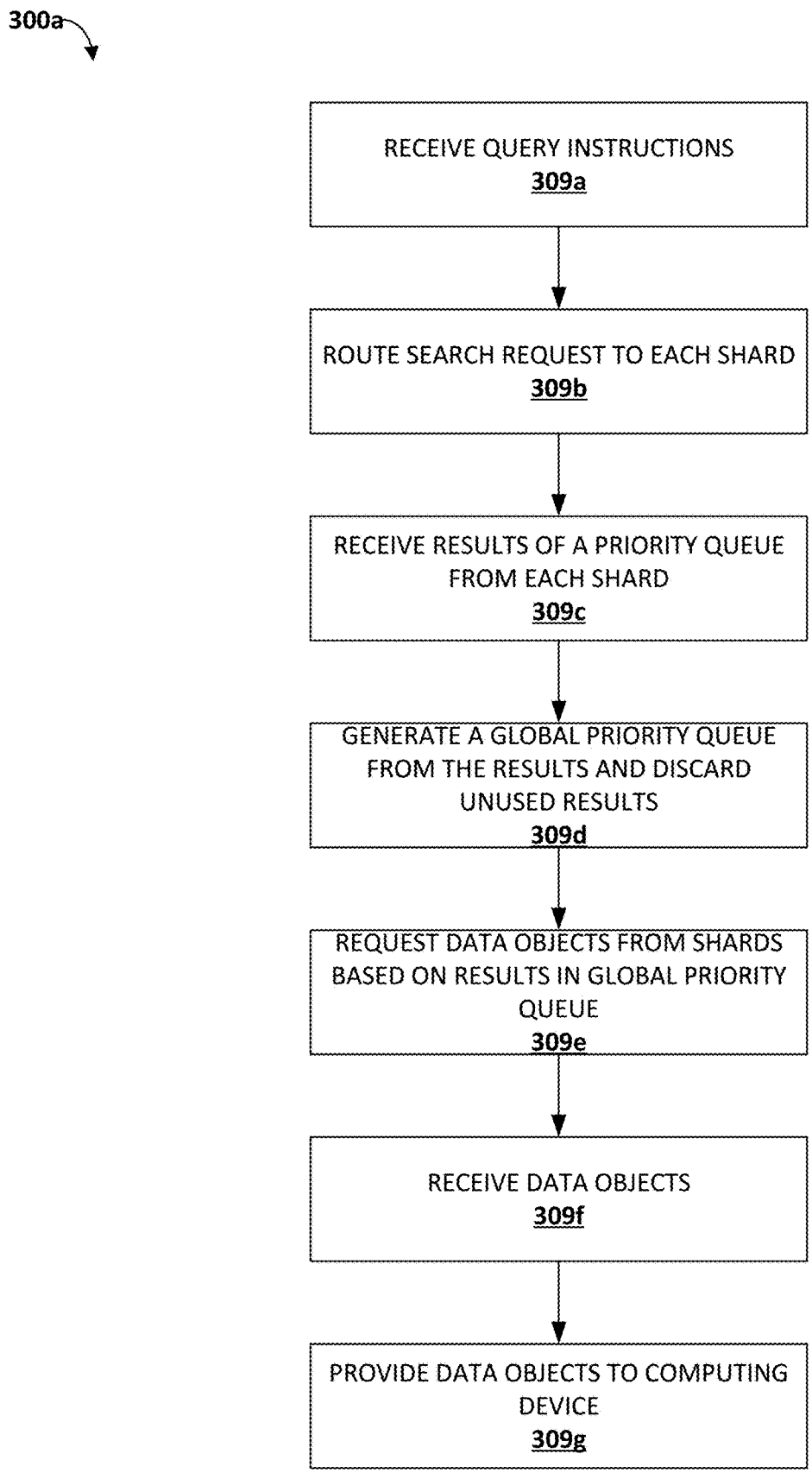
FIG. 3B is flowchart illustrating a sub-method of a distributed search for the method of FIG. 3A according to an embodiment of the present disclosure.

Referring now to FIGS. 3A and 3B, a method 300 for deep pagination in a distributed database system is illustrated according to an embodiment. In various embodiments, the deep pagination engine 123 of the computing device 120 included in the deep pagination system 125 may execute some or all operations of the method 300. However, it is contemplated that computing device 110 and/or the distributed database system 130 may execute some or all operations of the method 300 according to various embodiments. The method 300 begins at block 302 where a request for data is received from a client device. In an embodiment, at block 302, the application 112 (provided by the computing device 110) may make a request for data objects to the application 122 (provided by the computing device 120) via the network 150. For example, a merchant computing device may request a payment provider computing device for a list of transactions that were conducted by the payment provider computing device for the merchant over the last day or other time duration. The request for data may include search parameters that identifies the data that is being requested. In the above example, the request may include the time frame, a merchant identifier, and data type (e.g., transactions).

The method 300 then proceeds to block 304 where a number of data objects to be returned to the client device based on the request for data is calculated. In an embodiment, at block 304, the deep pagination engine 123 may calculate the number of data results to be returned to the computing device 110 based on the request for data. The calculation of the number of data results may be completed by performing a count query with the distributed index (e.g., a distributed database) provided by the distributed database system 130. The count query may be performed before performing a query with the distributed database system 130 to obtain the data objects from the distributed database system 130. Count query is much faster than a data object query because count is performed in parallel on each individual shard which counts the number of objects to return to the coordinating node and the coordinating node just sums up the result from each node. The distributed index is a collection of data objects (e.g., documents such as JSON objects) that have similar characteristics. For example, there may be a distributed index for customer data and another distributed index for product information. A distributed index is identified by a unique name that refers to the index when performing indexing search, updating, and deleting operations. The cluster 135 may include as many indexes as a user specifies and the data objects for each distributed index may be distributed across the various nodes 215a-215c and the shards 220a-220f such that data objects of the distributed index are stored across the shards 220a-220f.

The method 300 then proceeds to block 306 where a query with a distributed search engine to search a distributed index for the data in the request is initiated based on at least a first portion of the number of data objects. In an embodiment, at block 306, the deep pagination engine 123 may send query instructions to the coordinating node 210 to query, via the distributed search engine 132, the distributed database system 130 for data objects identified by the search parameters in the query instructions. The query instructions may include the search parameters (e.g., a date range, a value, a Boolean expression, searchable words or phrases, and/or other search parameters) that were provided in the request for data from the computing device 110. In an embodiment, at block 306, the query instructions may include a portion of the number of data objects that are to be returned in response to the request from the computing device 110. For example, the portion of the number of data objects that are to be returned in response to the query instructions may include a predetermined value that satisfies a performance condition when paginating the distributed database system 130. Prior to method 300, a system administrator may perform performance testing on the distributed database system 130 to determine the predetermined value by finding a number of data objects per search request that can be returned without affecting a performance condition of the distributed database system 130 (e.g., the maximum number of data objects that can be returned before deep pagination occurs).

For example, the predetermined value may be a maximum number of data objects returned by the distributed database system 130 by pagination that still satisfies a performance condition. In a specific example, the maximum number of data objects per query/search may be 10,000 data objects. However, in other embodiments, the predetermined value of search results may be any other value that satisfies the performance condition (e.g., 5,000 data objects, 7,500 data objects, 15,000 data objects, 20,000 data objects, etc.). If the number of data objects that are to be returned in response to the request from the computing device 110 is, for example, 16,000 data objects, then the portion of the number of data objects that is identified in the query instructions should be no more than 10,000 because 10,000 is the maximum number of data objects that can be returned per query instructions to avoid system performance degradation caused by deep pagination. The remaining 6,000 data objects will be retrieved as discussed below.

In various embodiments, if the number of data objects that are to be returned in response to the query instructions is below the predetermined value, then the query instructions may include a value that represents the number of data objects. For example, if the maximum number of data objects returned per query is 10,000 data objects but the number of data objects for to satisfy the request for data from the computing device or the current query instructions is only 5,000 data objects, then the query instructions may include a value of 5,000 data objects.

Referring now to FIG. 3B, a method 300a of a distributed search performed by the coordinating node 210 of the distributed database system 1 is illustrated. At block 309a, the distributed search engine 132 receives the query instructions from the computing device 120. In response to receiving the query instructions, the distributed search engine 132 may perform a distributed search that includes pagination based on the search parameters and the portion of the number of data objects that are to be returned in response to the request from the computing device 110. In an example where the distributed search engine 132 operates according to an Elasticsearch™ algorithm, the distributed search engine 132, at block 309*b*, may route a search request that includes the search parameters and a number of data objects that are to be returned for a current page to each shard 220*a*-220*f*. The shards 220*a*-220*f* perform the search independently using a local search engine and each shard 220*a*-220*f* creates a respective priority queue of results sorted by a relevance score.

At block 309*c*, the distributed search engine 132 receives results of each respective priority queue from each shard 220*a*-220*f*. Each shard 220*a*-220*f* returns in a result a data object identifier and a relevance score for each data object that satisfies the search request. The number of results returned to the coordinating node 210 from each shard 220*a*-220*f* may be the number of data objects that are to be returned for the current page of the pagination process. At block 309*d*, the distributed search engine 132 then creates a global priority queue of the results from each shard 220*a*-220*f* based on the relevance scores and discards the remaining results. The number of results that are included in the global priority queue is the predetermined number of data objects that are to be returned for the current page of the pagination process. The predetermined number of data objects that are to be returned per page of the pagination process may be an arbitrary number of data objects set by the system administrator and may be determined during the performance testing that is used to determine the predetermine value (e.g., the maximum number of data objects that are to be returned per query instruction).

After the distributed search engine 132 generates the global priority queue and at block 309*e*, the distributed search engine 132 requests the data objects that are identified in the global priority queue, using the data object identifier, from the shards 220*a*-220*f* in which those data objects are stored. The shards 220*a*-220*f* that include the data objects return those data objects identified in the data object request to the coordinating node 210 such that the distributed search engine 132 receives the data objects, at block 309*f* and provides the data objects to the computing device 120, at block 309*g*.

For example, and continuing with the example above, if the portion of the number of data objects that is identified in the query instructions as having the predetermined value of 10,000 data objects and the distributed search engine 132 is configured with the predetermined number to return 500 data objects per page, then 20 pages of data objects are required to return the 10,000 data objects. The distributed search engine 132 may provide to each shard 220*a*-220*f* a search request for 500 data objects and the search parameters to satisfy the first page. Each shard 220*a*-220*f* will return a priority queue with 500 results that each include a data object identifier and a relevance score to the coordinating node 210. The coordinating node 210 may then determine the global priority queue from the 3,000 results returned that includes 500 results and discard the remaining 2,500 results. The coordinating node 210 then requests the 500 data objects that are identified in the global priority queue using the data object identifier from the shards 220*a*-220*f* in which those data objects are stored. The shards 220*a*-220*f* then return their portion of the 500 data objects requested to the coordinating node 210.

This can be repeated for each page until the 10,000 data objects are returned. For example, the distributed search engine 132 may provide to each shard 220*a*-220*f* a search request for 1,000 data objects and the search parameters to satisfy the second page. Each shard 220*a*-220*f* will return a priority queue with 1,000 results that each include a data object identifier and a relevance score. After each search request, the coordinating node 210 receives a response from each shard 220*a*-220*f* that includes the 1,000 results and selects the best 500 results from the 6,000 results that are returned from the shards 220*a*-220*f*. The coordinating node 210 uses the best 500 results to determine the global priority queue from the 6,000 results returned and discards the remaining 5,500 results. The coordinating node 210 then requests the next best 500 data objects that are identified in the global priority queue using the data object identifier from the shards 220*a*-220*f* in which those data objects are stored. The shards 220*a*-220*f* then return their portion of the next best 500 data objects requested to the coordinating node 210. This pagination continues until all the data objects have been returned.

Referring back to FIG. 3A, the method 300 then proceeds to block 308 where each data object obtained by the distributed search engine from the distributed index is stored in an output buffer. In an embodiment, at block 308, the distributed search engine 132 provides the data objects of each page returned from the shards 220*a*-220*f* to the computing device 120 such that the deep pagination engine 123 stores the data objects in the output buffer 124. As discussed above, the output buffer 124 may include a storage device that may store a portion of the data objects. In some implementations, the output buffer may have a 16,332 byte capacity. However, other output buffer capacities are contemplated as falling within the scope of the present disclosure.

The method 300 then proceeds to decision block 310 where it is determined whether the output buffer satisfies a buffer flush condition. In an embodiment, at decision block 310, the deep pagination engine 123 may continue to store data objects received from coordinating node 210 and determine whether a buffer flush condition exists. The buffer flush condition may include the output buffer 124 becoming full or at a capacity condition, a last data object of the portion of the number of data objects that are to be returned in response to the request from the computing device 110 is stored in the output buffer 124 (e.g., the 10,000$^{th}$ data object), the last data object of the number of data objects (e.g., the 16,000$^{th}$ data object) and/or any other buffer flush condition that would be apparent to one of skill in the art in possession of the present disclosure. If the buffer flush condition is not satisfied, the method 300 returns to block 308 where the deep pagination engine 123 continues to store data objects in the output buffer 124.

However, if, at decision block 310, the buffer flush condition is satisfied, then the method 300 proceeds to block 312 where the data objects stored in the output buffer are sent via the network to the client device. In an embodiment, at block 312, the deep pagination engine 123 may send the data objects stored in the output buffer 124 to the computing device 110. The computing device 110 and the computing device 120 may have established a streaming connection such that the data objects are streamed on that streaming connection. The output buffer 124 may be emptied when the data objects are sent to the computing device 110. While the disclosure discusses an output buffer 124, in some embodiments, the data objects may be continuously streamed to the computing device 110 as the data objects are being retrieved by the coordinating node 210 and the computing device 120.

The method 300 then proceeds to decision block 314 where it is determined whether the last data object of the portion of the number of data objects that are to be returned in response to the request from the client device that were queried in the query instruction has been received. If the last data object has been received in decision block 314, a determination is made in decision block 315 determining whether all of the data objects that are to be returned in response to the request from the client device have been returned. In an embodiment, at decision blocks 314 and 315, the deep pagination engine 123 may determine whether the last data object that was received as a result of the query instructions has been received. The deep pagination engine 123 may also determine whether that last data object is the last data object of the data objects that is to be returned in response to the request from the computing device 110 (e.g., the 16,000$^{th}$ data object). If the last data object of the query instructions has not been received, the method 300 proceeds back to block 308. If the last data object that has been received is the last data object of the data objects that is to be returned in response to the request from the computing device 110, then the method 300 may proceed to block 316. In block 316, the method 300 may end, which may include closing the streaming connection between the computing device 110 and the computing device 120 after that last data object is sent to the computing device 110.

If the last data object is the last data object that was received as a result of the query instructions, then the method 300 may proceed to block 318. In block 318, additional query instructions with a distributed search engine to search the distributed index for the data objects in the request is initiated based on at least an n$^{th}$ portion of the number of data objects such that the additional query includes a data object identifier of the last data object returned for the first/previous query. In an embodiment, at block 318, the deep pagination engine 123 may send additional query instructions to the coordinating node 210 to perform an additional search, via the distributed search engine 132, of the distributed database system 130 for data objects identified by the search parameters in the additional query instructions. The additional query instructions may include a data object identifier of the last data object returned for the first query instructions. The additional query instructions may include the search parameters that were provided in the first query instructions.

In an embodiment, at block 318, the additional query instructions may include an n$^{th}$ portion of the number of data objects that are to be returned in response to the request from the computing device 110. For example, the portion of the number of data objects that are to be returned in response to the additional query instructions may include the predetermined value that satisfies the performance condition when paginating the distributed database system 130. As discussed above, the predetermined value may be a maximum number of data objects returned by the distributed database system 130 by pagination that still satisfies a performance condition (e.g., 10,000 data objects). However, the portion of the number of data objects that are to be returned in response to the additional query instructions may be the remaining number of data objects that are to be returned in response to the request from the computing device 110 (e.g., the remaining 6,000 data objects of the 16,000 data objects determine in block 304).

In response to receiving the additional query instructions, the distributed search engine 132 may perform a distributed search that includes pagination. The distributed search may be based on the search parameters, the portion of the number of data objects that are to be returned in response to the request from the computing device 110, and the data object identifier of the last data object returned for the previous query instructions. In an example where the distributed search engine 132 operates according to an Elasticsearch™ algorithm, the distributed search engine 132 of the coordinating node 210 may route a search request that includes the search parameters, a number of data objects that are to be returned for a first page of the additional query instruction, and the data object identifier of the last data object returned for the previous query instructions to each shard 220a-220f. The shards 220a-220f perform the search independently using the local search engine and each shard 220a-220f creates a respective priority queue of results sorted by a relevance score starting.

The priority queue of results starts with data objects that are subsequent to the data object identifier of the last data object. Each shard 220a-220f returns a data object identifier and a relevance score for each data object that satisfies the search request. The number of results returned to the coordinating node 210 from each shard 220a-220f may be the number of data objects that are to be returned for the current page of the pagination process. The coordinating node 210 then creates a global priority queue of the results from each shard 220a-220f based on the relevance scores and discards the remaining results. The number of results that are included in the global priority queue is the predetermined number of data objects that are to be returned for the current page of the pagination process.

After the coordinating node 210 generates the global priority queue, the coordinating node 210 requests the data objects that are identified in the global priority queue using the data object identifier from the shards 220a-220f in which those data objects are stored. The shards 220a-220f that include the data objects return those data objects identified in the data object request to the coordinating node 210. As discussed above, the coordinating node 210 performs pagination until all of the data objects for the addition query instructions have been received and the method 300 returns to block 308.

Thus, the systems and method of the present disclosure may provide a deep pagination engine that may obtain more data objects than what performance conditions allow to be returned in conventional distributed database systems. The deep pagination engine may obtain the maximum number of data objects per distributed search. The deep pagination engine may then track the last data object identifier in that distributed search. The deep pagination engine may then provide that last data object identifier in an additional search such that the distributed database system may perform an additional search beginning from that last data object identifier. This process of tracking the last data object identifier of each distributed search and including the last data object identifier in subsequent searches limits the effects of deep pagination on the distributed database system such that a distributed database system can be used in situations where relatively large sets of data objects are required.

Figure 4:
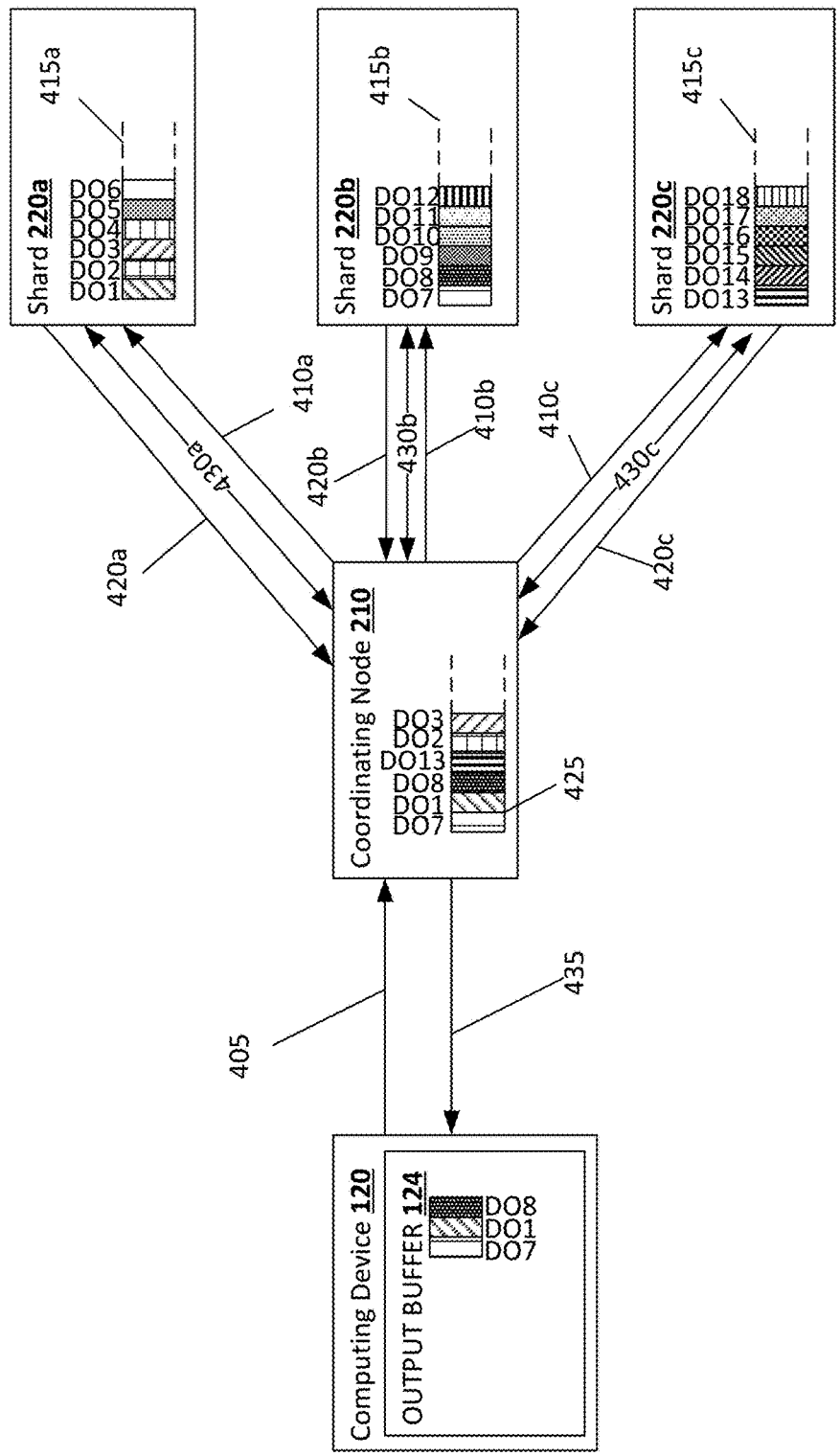
FIG. 4 is a block diagram illustrating the deep pagination system of FIG. 2 operating during the method of FIGS. 3A and 3B.
Figure 5:
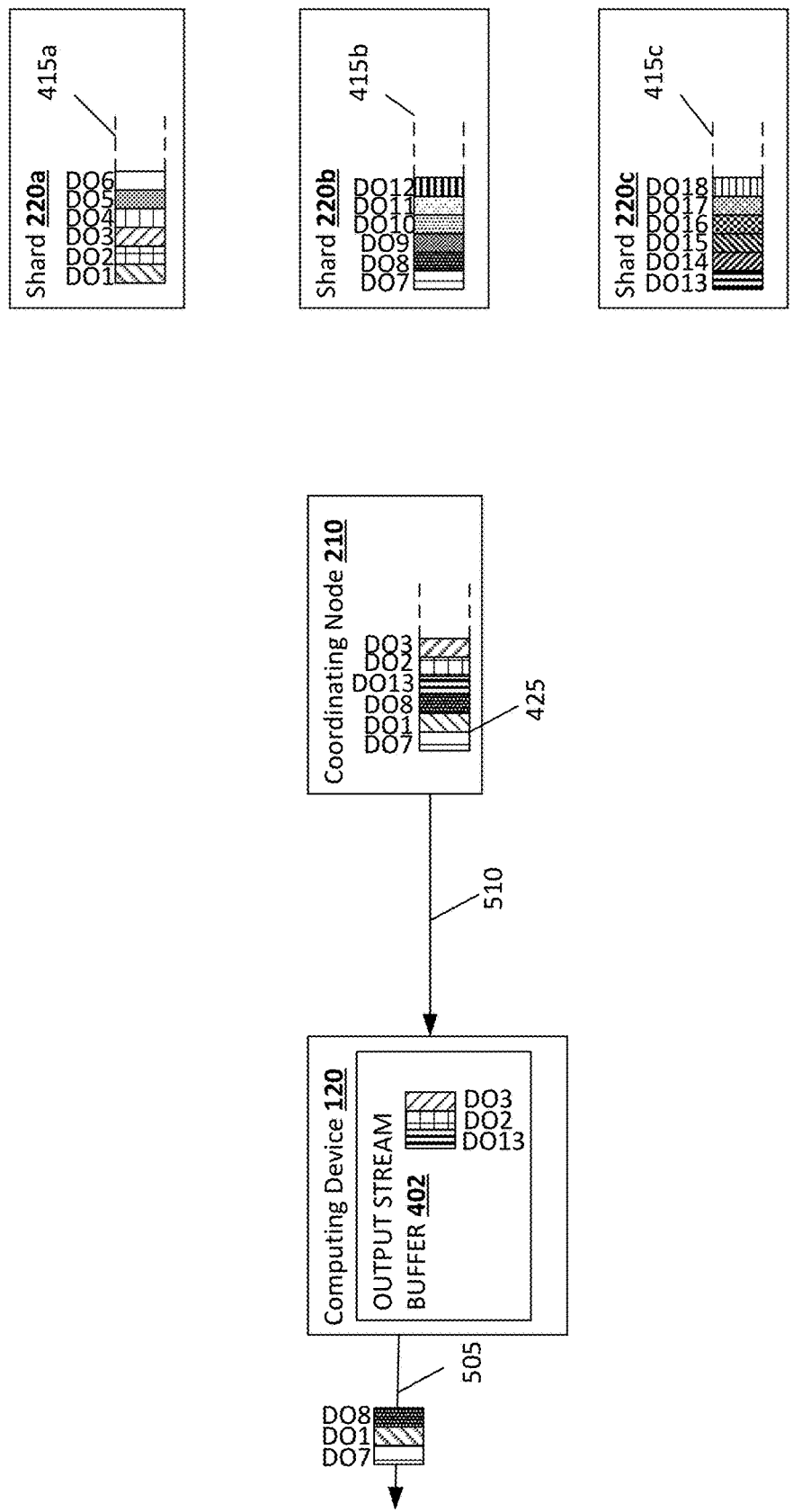
FIG. 5 is a block diagram illustrating the deep pagination system of FIG. 2 operating during the method of FIGS. 3A and 3B.
Figure 6:
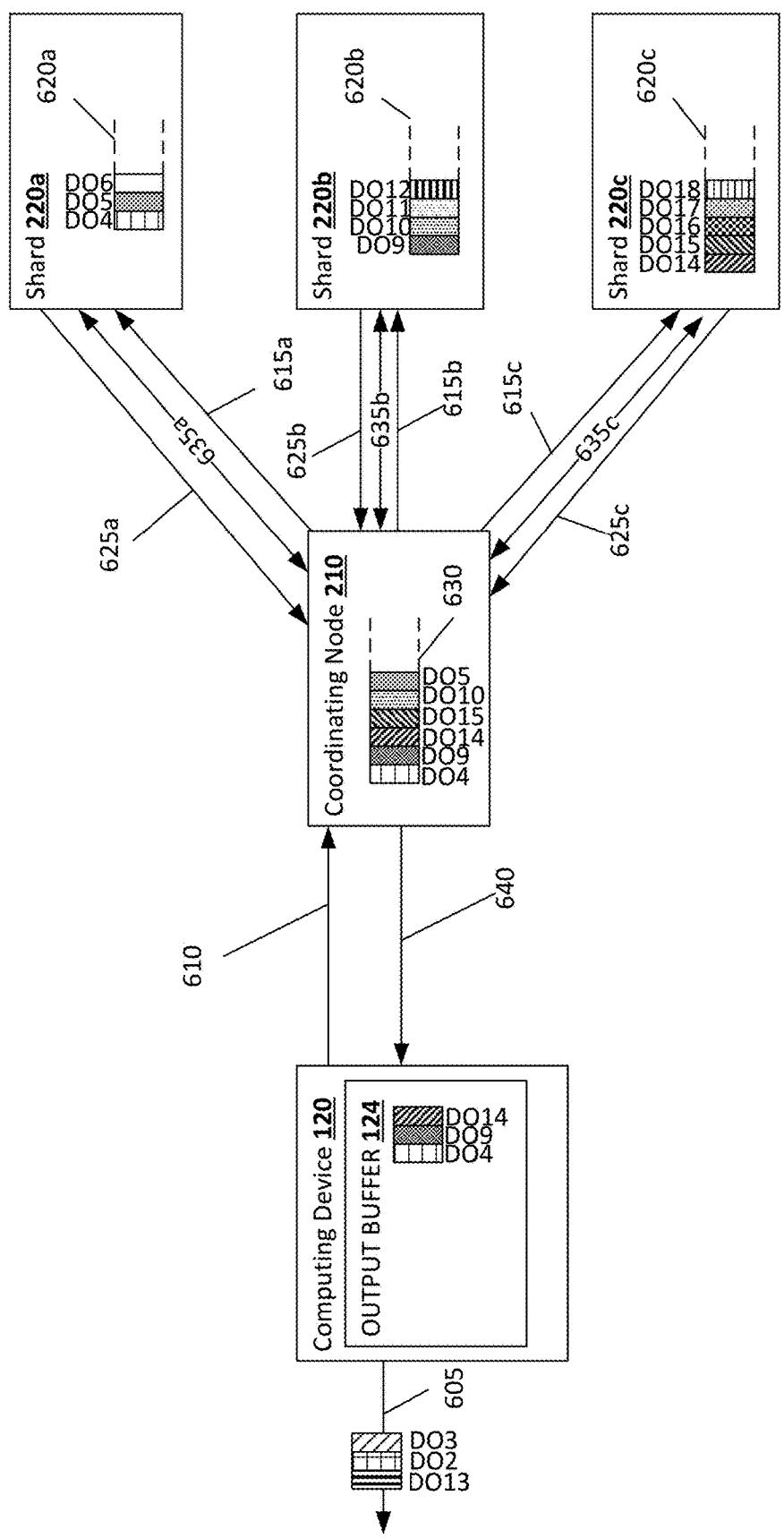
FIG. 6 is a block diagram illustrating the deep pagination system of FIG. 2 operating during the method of FIGS. 3A and 3B.

Referring now to FIGS. 4, 5, and 6, an example of the method 300 is illustrated. In the illustrated example, the number of data objects that are to be returned in response to the request from the computing device 110 may be 12 data objects and the maximum number of data objects that the coordinating node 210 can return per distributed search is 6 data objects. For simplicity, the number of data objects that may be obtained per page may also be 6 data objects, which results in only one page per distributed search. However, one of skill in the art in possession of the present disclosure will recognize that the number of data objects that may be obtained per page may also be fewer resulting in multiple pages per distributed search (e.g., 2 data objects, which results in 3 pages per distributed search). One of skill in the art will recognize that obtaining multiple pages per distributed search may be performed conventionally without changing the scope of the method and example discussed below As illustrated in FIG. 4, the computing device 120 may provide query instructions 405 to the coordinating node 210 that may include search parameters and a portion of number of data objects (e.g., 6 data objects) that are to be returned in response to a request from the computing device 110. The distributed search engine 132 of the coordinating node 210 may route a search request 410a that includes the search parameters and the number of data objects that are to be returned for the current page to the shard 220a, route a search request 410b that includes the search parameters and the number of data objects that are to be returned for the current page to the shard 220b, and route a search request 410c that includes the search parameters and the number of data objects that are to be returned for the current page to the shard 220c.

The shards 220a-220c perform the search independently using a local search engine and each shard 220a-220c creates a respective priority queues 415a, 415b, and 415c of results sorted by a relevance score. The priority queue 415a may include data objects DO1, DO2, DO3, DO4, DO5, and DO6. The priority queue 415b may include data objects DO7, DO8, DO9, DO10, DO11, and DO12. The priority queue 415c may include data objects DO13, DO14, DO15, DO16, DO17, and DO18. Each shard 220a-220c returns a response (e.g., a response 420a, a response 420b, and a response 420c) that includes a data object identifier and a relevance score for each data object that satisfies the search request. The number of results returned to the coordinating node 210 from each shard 220a-220c may be the number of data objects that are to be returned for the current page of the pagination process, which in the illustrated example is 6 data objects.

The coordinating node 210 can then create a global priority queue 425 of the results from each shard 220a-220c based on the relevance scores and discards the remaining results. In other words, the global priority queue is a sorted list of the best results returned by shards 220a-220c at the coordinating node 210. In the illustrated example, the global priority queue 425 may include data objects DO7, DO1, DO8, DO13, DO2, and DO3. The number of results that are included in the global priority queue 425 is the predetermined number of data objects that are to be returned for the current page of the pagination process, which is 6 data objects in the illustrated example. The coordinating node 210 then performs a fetch operation 430a that retrieves DO1, DO2, and DO3 from the shard 220a, a fetch operation 430b that retrieves DO7 and DO8 from the shard 220b, and a fetch operation 430c that retrieves DO13 from the shard 220c.

As the data objects DO7, DO1, DO8, DO13, DO2, and DO3 are returned to the coordinating node 210, the coordinating node 210 provides the data objects to the computing device 120 (as indicated by arrow 435), which stores the data objects in the order of relevance in the output buffer 124. As illustrated in FIG. 4, the computing device 120 has stored the data objects DO7, DO1, and DO8 in the output buffer 124. The computing device 120 may monitor for a flush buffer condition, which may include the output buffer 124 being at a storage capacity, the last data object for the query instruction is received, and/or the last data object of the number of data objects that are to be returned in response to the request from the computing device 110. In the example illustrated in FIG. 4, the output buffer 124 may become full with the three data objects DO7, DO1, and DO8. As illustrated in FIG. 5, the computing device 120 then performs a flush operation 505 where the data objects are sent to the computing device 110 via the network 150. The data objects DO7, DO1, and DO8 may be sent via a streaming connection between the computing device 110 and the computing device 120 as a chunk of data (e.g., a subset of the data object results). The coordinating node 210 provides the remaining data objects DO13, DO2, and DO3 of the page (as indicated by arrow 510), and in this example, the remaining data objects that were identified in the query instructions 405.

As illustrated in FIG. 6, the computing device 120 then performs a flush operation 605 where the data objects are sent to the computing device 110 via the network 150. The data objects DO13, DO2, and DO3 may be sent via a streaming connection as a chunk of data (e.g., a subset of the data object results). The computing device 120 may provide query instructions 610 to the coordinating node 210 that may include search parameters and a remaining portion of number of data objects (e.g., the remaining 6 data objects of the 12 data objects) that are to be returned in response to the request from the computing device 110. The query instructions 610 may also include a data object identifier for the data object DO3 because the data object identifier for data object DO3 was the last data object that satisfied the query instructions 405. The distributed search engine 132 of the coordinating node 210 may route a search request 615a that includes the search parameters, the number of data objects that are to be returned for the current page to the shard 220a, and the data object identifier for data object DO3. The distributed search engine 132 of the coordinating node 210 may route a search request 615b that includes the search parameters, the number of data objects that are to be returned for the current page to the shard 220b, and the data object identifier for data object DO3. The distributed search engine 132 of the coordinating node 210 may route a search request 615c that includes the search parameters, the number of data objects that are to be returned for the current page to the shard 220c, and the data object identifier for data object DO3. The shards 220a-220c perform the search independently using a local search engine based on the search parameters and the data object identifier for the data object DO3 and each shard 220a-220c creates respective priority queues 620a, 620b, and 620c of results sorted by a relevance score.

The priority queue 620a may include data objects DO4, DO5, DO6, and three other data objects not illustrated. There are three other data objects selected from the database at shard 220a besides DO4, DO5, and DO6 because, as stated above, there are 6 results per page. However, if there are only 3 data objects that satisfy the search criteria in shard 220a, then only the remaining 3 data objects will be returned. Similarly, the priority queue 620b may include data objects DO9, DO10, DO11, DO12, and possibly two other data objects not illustrated. The priority queue 415c may include data objects DO14, DO15, DO16, DO17, DO18 and possibly one other data object not illustrated. Each shard 220a-220c returns a response (e.g., a response 625a, a response 625b, and a response 625c) that includes a data object identifier and a relevance score for each data object that satisfies the search request. The number of results returned to the coordinating node 210 from each shard 220a-220c may be the number of data objects that are to be returned for the current page of the pagination process, which in the illustrated example is 6 data objects. The coordinating node 210 then creates a global priority queue 630 of the results from each shard 220a-220c based on the relevance scores and discards the remaining results. In the illustrated example, the global priority queue 630 may include data objects DO4, DO9, DO14, DO15, DO10, and DO5. The number of results that are included in the global priority queue 630 is the predetermined number of data objects that are to be returned for the current page of the pagination process, which is 6 data objects in the illustrated example. The coordinating node 210 then performs a fetch operation 635a that retrieves DO4 and DO5 from the shard 220a, a fetch operation 635b that retrieves DO9 and DO10 from the shard 220b, and a fetch operation 635c that retrieves DO14 and DO15 from the shard 220c.

As the data objects DO4, DO9, DO14, DO15, DO10, and DO5 are returned to the coordinating node 210, the coordinating node 210 can provide the data objects to the computing device 120 (as indicated by arrow 640), which stores the data objects in the order of relevance in the output buffer 124. The computing device 120 can provide the data objects to the computing device 110 when a buffer flush condition is present until the data object DO5 is sent, which is the last data object being requested by the computing device 110. The streaming connection between the computing device 110 and the computing device 120 may be terminated after the last data object has been sent.

Figure 7:
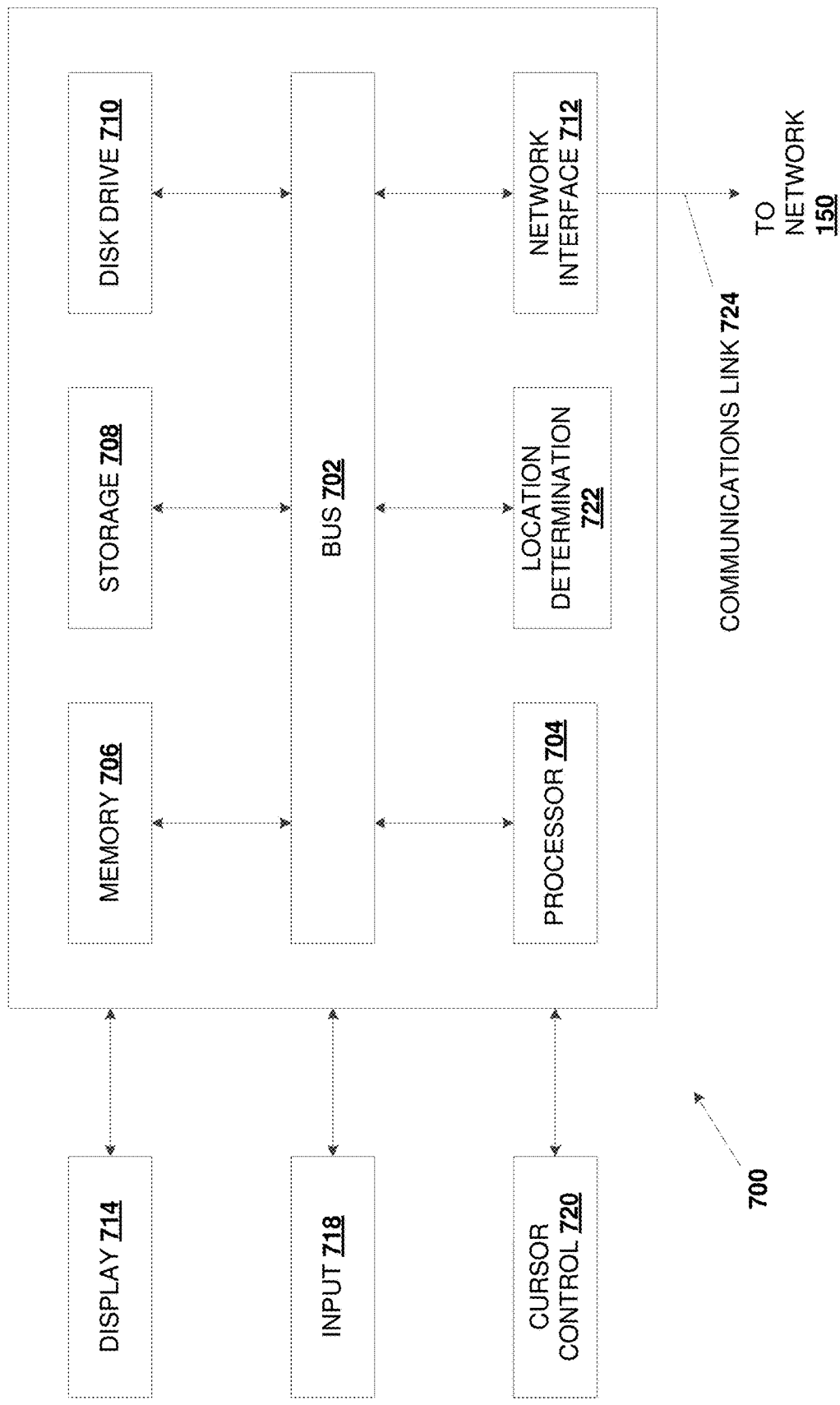
FIG. 7 is a block diagram of an example computer system according to various aspects of the present disclosure.

FIG. 7 is a block diagram of a computer system 700 suitable for implementing one or more embodiments of the present disclosure, including the distributed database system 130, the computing device 120, the computing device 110, the coordinating node 210, the nodes 215a-215c and/or the shards 220a-220f. In various implementations, the computing device 110 may include a mobile cellular phone, personal computer (PC), laptop, wearable computing device, etc. adapted for wireless communication, and each of the computing device 120 and the distributed database system 130 may include a network computing device, such as a server. Thus, it should be appreciated that the devices 110, 120, 130, 210, 215a-215c and/or 220a-220f may be implemented as the computer system 700 in a manner as follows.

In accordance with various embodiments of the present disclosure, computer system 700, such as a computer and/or a network server, includes a bus 702 or other communication mechanism for communicating information, which interconnects subsystems and components, such as a processor 704 (e.g., processor, micro-controller, digital signal processor (DSP), etc.), a system memory component 706 (e.g., RAM), a static storage component 708 (e.g., ROM), a disk drive component 710 (e.g., magnetic or optical), a network interface component 712 (e.g., modem or Ethernet card), a display component 714 (e.g., CRT or LCD), an input component 718 (e.g., keyboard, keypad, or virtual keyboard), a cursor control component 720 (e.g., mouse, pointer, or trackball), and/or a location determination component 722 (e.g., a Global Positioning System (GPS) device as illustrated, a cell tower triangulation device, and/or a variety of other location determination devices known in the art.) In one implementation, the disk drive component 710 may comprise a database having one or more disk drive components.

In accordance with embodiments of the present disclosure, the computer system 700 performs specific operations by the processor 704 executing one or more sequences of instructions contained in the memory component 706, such as described herein with respect to the computing devices and anomaly detection server, and/or any other device. Such instructions may be read into the system memory component 706 from another computer readable medium, such as the static storage component 708 or the disk drive component 710. In other embodiments, hard-wired circuitry may be used in place of or in combination with software instructions to implement the present disclosure.

Logic may be encoded in a computer readable medium, which may refer to any medium that participates in providing instructions to the processor 704 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 710, volatile media includes dynamic memory, such as the system memory component 706, and transmission media includes coaxial cables, copper wire, and fiber optics, including wires that comprise the bus 702. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 700. In various other embodiments of the present disclosure, a plurality of the computer systems 700 coupled by a communication link 724 to the network 150 (e.g., such as a LAN, WLAN, PTSN, and/or various other wired or wireless networks, including telecommunications, mobile, and cellular phone networks) may perform instruction sequences to practice the present disclosure in coordination with one another.

The computer system 700 may transmit and receive messages, data, information and instructions, including one or more programs (i.e., application code) through the communication link 724 and the network interface component 712. The network interface component 712 may include an antenna, either separate or integrated, to enable transmission and reception via the communication link 724. Received program code may be executed by processor 704 as received and/or stored in disk drive component 710 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a computing device, a server device, other devices described herein.

What is claimed is:

1. A system, comprising:
   a non-transitory memory storing instructions; and
   one or more hardware processors coupled to the non-transitory memory and configured to read the instructions from the non-transitory memory to cause the system to perform operations comprising:
     receiving, from a client device, a request for data objects;
     determining, from the request, search parameters for a number of the data objects being queried based on the request;
     performing, based on the search parameters, a count query of the number of the data objects available with a distributed search engine that searches a distributed index for the data objects independent of a data object query to return the data objects to the client device, wherein the count query is performed in parallel from different nodes of the distributed index and with a first query;
     calculating the number of the data objects to be returned to the client device based on the count query;
     performing the first query with the distributed search engine to search the distributed index for the data objects based on at least a first portion of the number of the data objects from the count query being performed in parallel with the different nodes of the distributed index;
     writing each data object from a first data object set returned by the distributed search engine from the distributed index to an output buffer; and
     sending, via a streaming connection, the data objects stored in the output buffer when a first condition is satisfied.

2. The system of claim 1, wherein the operations further comprise:
   determining, in response to the sending the data objects stored in the output buffer when the first condition is satisfied, that the first data object set has not been completely sent to the client device;
   writing remaining data objects of the first data object set to the output buffer; and
   sending, via the streaming connection, the remaining data objects stored in the output buffer when a final data object of the first data object set is written to the output buffer.

3. The system of claim 1, wherein the operations further comprise:
   determining, from the number of data objects to be returned to the client device and a predetermined data object set capacity, that a plurality of data object sets is required to satisfy the request for the data objects;
   in response to the sending the data objects stored in the output buffer when the first condition is satisfied and the first condition is that a last data object of the first data object set is written to the output buffer, performing a second query with the distributed search engine to search the distributed index for the data objects having identifiers that are subsequent to an identifier for the last data object of the first data object set;
   writing each data object from a second data object set to the output buffer; and
   sending, via the streaming connection, the data objects stored in the output buffer when a second condition is satisfied.

4. The system of claim 3, wherein the operations further comprise:
   terminating the streaming connection when all of the data objects that satisfy the request for the data objects have been sent.

5. The system of claim 1, wherein each data object includes a respective JavaScript Object Notation (JSON) object.

6. The system of claim 1, wherein the first condition is satisfied when an available storage of the output buffer is at a capacity condition.

7. The system of claim 1, wherein the calculating the number of data objects to be returned to the client device based on the request for data objects includes performing a count query with the distributed index before performing the first query.

8. The system of claim 1, wherein the distributed search engine includes an Elasticsearch search engine that searches the distributed index and the distributed index includes a cluster of a plurality of nodes where each node of the plurality of nodes includes one or more index shards and where each node of the plurality of nodes stores the data objects as distributed data across the one or more index shards.

9. A method, comprising
   receiving, by a computing device, a request for data objects to be returned to a client device;
   determining, from the request, search parameters for a number of the data objects being queried based on the request;
   performing, based on the search parameters, a count query of the number of the data objects available with a distributed search engine that searches a distributed index for the data objects independent of a data object query to return the data objects to the client device, wherein the count query is performed in parallel from different nodes of the distributed index and with a first query;
   calculating the number of the data objects to be returned to the client device based on the count query;
   performing, by the computing device, the first query with the distributed search engine to search the distributed index for the data objects based on the calculated number of the data objects, wherein the first query has a predetermined maximum number of data objects from the count query being performed in parallel with the different nodes of the distributed index; and transmitting, by the computing device, one or more chunks of the data objects for the first query as the data objects for the first query are returned by the distributed search engine from the distributed index, wherein each of the one or more chunks includes one or more data objects for the first query.

10. The method of claim 9, further comprising:
writing, by the computing device, each data object for the first query returned by the distributed search engine from the distributed index to an output buffer, wherein each chunk of the data objects for the first query includes the data objects included in the output buffer when the output buffer satisfies a condition.

11. The method of claim 10, wherein the condition is satisfied when the output buffer is full or when a last data object for the first query is included in the output buffer.

12. The method of claim 9, further comprising:
determining, by the computing device, that the first query has not satisfied the request for the data objects;
performing, by the computing device, a second query with the distributed search engine to search the distributed index for the data objects and for data objects having identifiers that are subsequent to an identifier for a last data object for the first query; and
transmitting, by the computing device, one or more chunks of the data objects for the second query as the data objects for the second query are returned by the distributed search engine from the distributed index.

13. The method of claim 9, further comprising:
terminating, by the computing device, a streaming connection with a client computing device on which the transmitting is performed when all the data objects that satisfy the request for the data objects have been transmitted.

14. The method of claim 9, wherein the first query causes the distributed search engine to search the distributed index for the data objects in the request by:
providing the request for the data objects to at least one shard of a plurality of shards included in the distributed index that includes a cluster of a plurality of nodes where each node of the plurality of nodes includes one or more shards and where each node of the plurality of nodes stores the data objects as distributed data across the one or more shards, wherein the request includes a request for a predetermined number of data object results;
receiving a shard priority queue of data object results from the at least one shard, wherein the shard priority queue includes the predetermined number of data objects results; and
determining a global priority queue of data object results based on each shard priority queue of data object results, wherein the global priority queue of data object result includes the predetermined number of data object result, and wherein the data objects identified by the global priority queue are retrieved from the at least one shard, respectively, and provided for the transmitting.

15. The method of claim 14, wherein the data object results in each shard priority queue not used in the global priority queue are discarded.

16. A non-transitory machine-readable medium having stored thereon machine-readable instructions executable to cause a machine to perform operations comprising:
receiving a request for a plurality of data objects to be returned to a client device;
determining, from the request, search parameters for a number of the data objects being queried based on the request;
performing, based on the search parameters, a count query of the number of the data objects available with a distributed search engine that searches a distributed index for the data objects independent of a data object query to return the data objects to the client device, wherein the count query is performed in parallel from different nodes of the distributed index and with a first query;
calculating the number of the data objects to be returned to the client device based on the count query;
performing the first query with the distributed search engine to search the distributed index for the data objects based on the calculated number of data objects, wherein the first query has a predetermined maximum number of data objects from the count query being performed in parallel with the different nodes of the distributed index;
transmitting the data objects for the first query as the data objects for the first query are returned by the distributed search engine from the distributed index;
determining that the first query has not satisfied the plurality of data objects;
performing a second query with the distributed search engine to search the distributed index for the remaining data objects of the plurality of data objects in the request, wherein the remaining data objects have identifiers that are subsequent to an identifier for the last data object for the first query; and
transmitting the data objects for the second query as the data objects for the second query are returned by the distributed search engine from the distributed index.

17. The non-transitory machine-readable medium of claim 16, wherein the operations further comprise:
writing each data object for the first query returned by the distributed search engine from the distributed index to an output buffer, wherein the data objects streamed includes the data objects included in the output buffer when the output buffer satisfies a condition.

18. The non-transitory machine-readable medium of claim 17, wherein the condition is satisfied when an available storage of the output buffer satisfies a capacity threshold or when the last data object for the first query is included in the output buffer.

19. The non-transitory machine-readable medium of claim 16, wherein the operations further comprise:
terminating a streaming connection with a client computing device on which the transmitting is performed when all the data objects that satisfy the request for the data objects have been transmitted.

20. The non-transitory machine-readable medium of claim 16, wherein the operations further comprise:
providing the request for the data objects to each shard of a plurality of shards included in the distributed index that includes a cluster of a plurality of nodes where each node of the plurality of nodes includes one or more shards and where each node of the plurality of nodes stores the data objects as distributed data across the one or more shards, wherein the request includes a request for a predetermined number of data object results;
receiving a shard priority queue of data object results from each shard, wherein each shard priority queue includes the predetermined number of data object results; and determining a global priority queue of data object results based on each shard priority queue of data object results, wherein the global priority queue of data object results includes the predetermined number of data object results, wherein the data objects identified by the global priority queue are retrieved from each shard, respectively, and provided for streaming.

* * * * *